United States Patent
Yamashita et al.

(10) Patent No.: US 9,241,117 B2
(45) Date of Patent: Jan. 19, 2016

(54) IMAGE PICKUP APPARATUS

(75) Inventors: Yuichiro Yamashita, Ebina (JP);
Shinichiro Shimizu, Yokohama (JP);
Toru Koizumi, Yokohama (JP); Takashi Matsuda, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 145 days.

(21) Appl. No.: 13/486,719

(22) Filed: Jun. 1, 2012

(65) Prior Publication Data

US 2012/0312964 A1    Dec. 13, 2012

(30) Foreign Application Priority Data

Jun. 8, 2011    (JP) ................................. 2011-128143

(51) Int. Cl.
*H04N 5/347*    (2011.01)
*H04N 5/3745*    (2011.01)

(52) U.S. Cl.
CPC ........... *H04N 5/347* (2013.01); *H04N 5/37457* (2013.01)

(58) Field of Classification Search
None
See application file for complete search history.

(56) References Cited

U.S. PATENT DOCUMENTS

| | | | |
|---|---|---|---|
| 7,705,900 B2 * | 4/2010 | Guidash | 348/308 |
| 7,777,171 B2 * | 8/2010 | Parks | 250/214.1 |
| 8,792,033 B2 * | 7/2014 | Sambonsugi | 348/302 |
| 2008/0210993 A1 * | 9/2008 | Oshikubo et al. | 257/292 |
| 2010/0182465 A1 * | 7/2010 | Okita | 348/273 |
| 2010/0225795 A1 | 9/2010 | Suzuki | |
| 2011/0080493 A1 * | 4/2011 | Kono et al. | 348/222.1 |
| 2011/0180689 A1 * | 7/2011 | Roy et al. | 250/208.1 |
| 2011/0221940 A1 * | 9/2011 | Kato et al. | 348/250 |
| 2013/0021510 A1 * | 1/2013 | Sambonsugi | 348/302 |
| 2013/0248939 A1 * | 9/2013 | Sakai et al. | 257/231 |

FOREIGN PATENT DOCUMENTS

| | | |
|---|---|---|
| CN | 1518345 A | 8/2004 |
| CN | 101668120 A | 3/2010 |
| CN | 102036020 A | 4/2011 |
| JP | H09-046596 A | 2/1997 |
| JP | 2006-211653 A | 8/2006 |
| JP | 2009-016972 A | 1/2009 |
| JP | 2009-033316 A | 2/2009 |
| JP | 2011-082768 A | 4/2011 |

* cited by examiner

*Primary Examiner* — Timothy J Henn
*Assistant Examiner* — Quan Pham
(74) *Attorney, Agent, or Firm* — Canon USA, Inc. IP Division

(57) ABSTRACT

An image pickup apparatus includes a plurality of pixels each including a read-out node to which an electric charge generated in a photoelectric conversion unit is transferred, an output unit configured to convert the electric charge transferred to the read-out node into a voltage and output the resultant voltage to a signal line, and a switch including a first node electrically connected to the read-out node. Each switch includes a second node different from the first node, and a particular number of second nodes are electrically connected to a common bypass wiring.

18 Claims, 10 Drawing Sheets

IMAGE PICKUP APPARATUS

BACKGROUND OF THE INVENTION

1. Field of the Invention

One aspect of the embodiments relates to an image pickup apparatus, and more particularly, to a technique of adding signals.

2. Description of the Related Art

One of techniques to add signals in an image pickup apparatus is disclosed in Japanese Patent Laid-Open No. 2009-033316. In this technique, floating diffusion parts (hereinafter, referred to as FD parts) of pixels adjacent in a vertical direction are electrically connected to each other via an FD-part connection switch. This connection is made for all pixels in a whole effective pixel array area of a solid state image pickup device. Each FD part functions as a part of a charge-voltage conversion unit that converts a transferred electric charge into a voltage.

In the technique disclosed in Japanese Patent Laid-Open No. 2009-033316, when electric charges of three or more FD parts are added together, it is necessary to provide two FD-part connection switches for each FD part to electrically connect the FD part to another FD part at an upper or lower location. This configuration results in an increase in capacitance of the charge-voltage conversion unit. The increase in capacitance of the charge-voltage conversion unit makes it difficult to achieve a high charge-to-voltage conversion factor in converting the electric charge generated in the photoelectric conversion unit into a voltage. In view of the above, one aspect of the embodiments provides an improved technique to add electric charges of FD parts.

SUMMARY OF THE INVENTION

According to an aspect of the embodiments, an image pickup apparatus includes a plurality of pixels each including a read-out node to which an electric charge generated in a photoelectric conversion unit is transferred, an output unit configured to convert the electric charge transferred to the read-out node into a voltage and output the resultant voltage to a signal line, and a switch including a first node connected to the read-out node, wherein each switch includes a second node different from the first node, and a particular number of second nodes are connected to a common bypass wiring.

Further features of the embodiments will become apparent from the following description of exemplary embodiments with reference to the attached drawings.

DESCRIPTION OF THE EMBODIMENTS

First Embodiment

One disclosed feature of the embodiments may be described as a process which is usually depicted as a timing diagram, a structure diagram, or a block diagram. Although a timing diagram may describe the operations or events as a sequential process, the operations may be performed, or the events may occur, in parallel or concurrently. An operation in a timing diagram may be optional. In addition, the order of the operations or events may be re-arranged.

Figure 1:
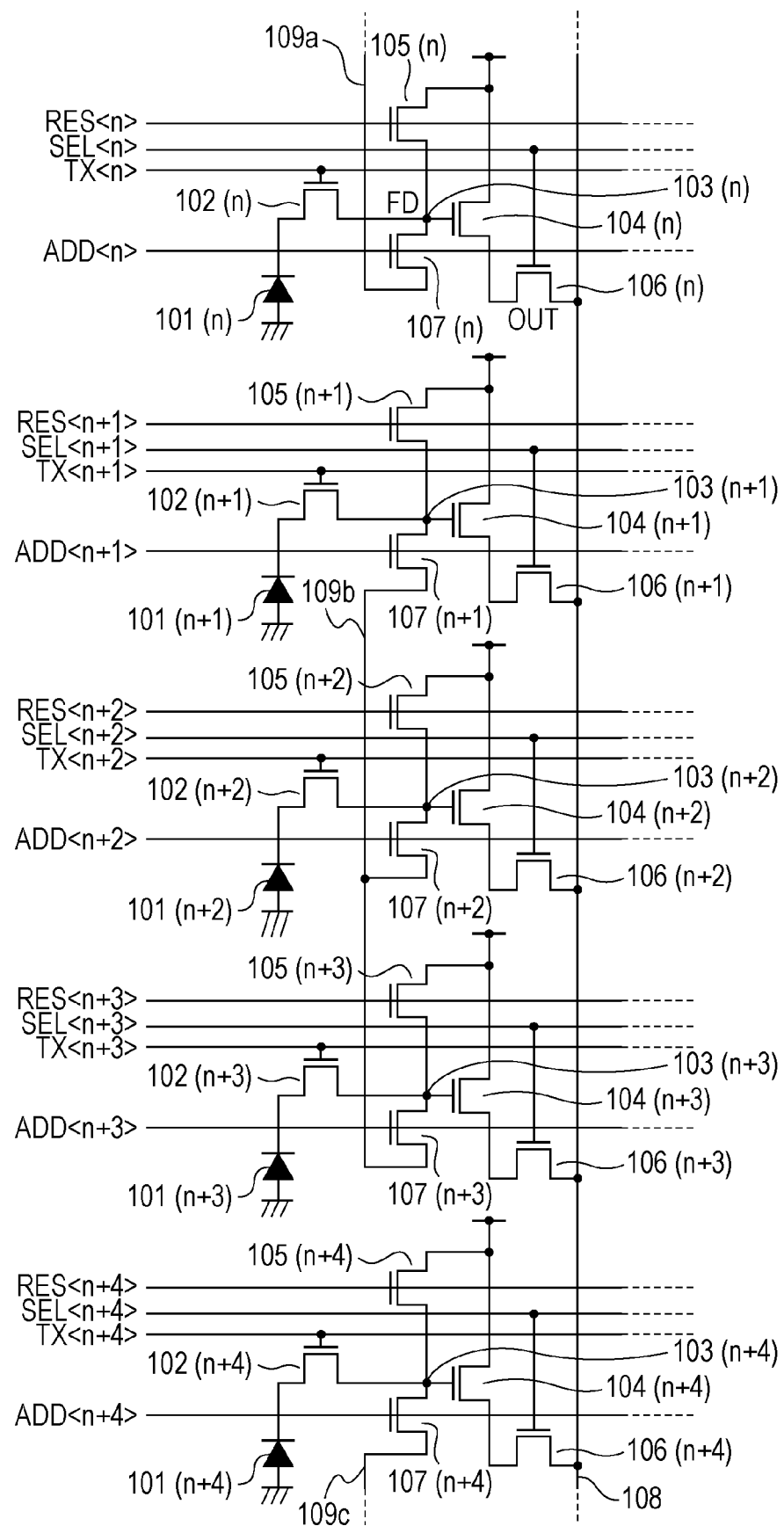
FIG. 1 is an equivalent circuit diagram of an image pickup apparatus according to a first embodiment.

FIG. 1 illustrates an equivalent circuit diagram applicable to an image pickup apparatus according to a first embodiment. Note that FIG. 1 shows only five pixels arranged in one direction, and more particularly, FIG. 1 shows five adjacent pixels arranged in a pixel column.

In an example shown in FIG. 1, a circuit is configured to be capable of adding signals of three FD parts 103. The add operation may be performed for electric charges of at least two FD parts 103. The add operation may be an operation of determining an average of electric charges of at least two FD parts 103. This also applies to other embodiments described later. The FD part is a specific example of a read-out node in a pixel. As for the read-out node, any node in a pixel may be employed as long as the node is configured such that a signal generated in a photoelectric conversion unit is read out to the node. In the following description, it is assumed by way of example that an FD part is used as each read-out node.

The configuration shown in FIG. 1 has a feature that each FD part 103 is connected to a bypass wiring 109 via a switch such that an electric connection between a plurality of FD parts 103 is controlled by controlling turning-on/off of the switch, as described in detail below with reference to FIG. 1. In the following description, it is assumed by way of example that electrons are used to provide signal charges. Note that holes may be used to provide signal charges. In this case, it is necessary to invert the polarity of a voltage and employ a conduction type for semiconductor regions opposite to that employed in the case where signal charges are electrons. In the following description, suffixes are used to indicate pixel rows.

FIG. 1 shows only five pixels arranged in an array including one column and five rows, although there may be a greater number of pixels. In practice, pixels may be arranged in a matrix form in an image sensing area.

Photoelectric conversion units 101(n) to 101(n+4) are for converting light into an electric signal. For example, a photodiode may be used as each of the photoelectric conversion unit 101(n) to 101(n+4).

Transfer units 102(n) to 102(n+4) transfer electric charges generated by corresponding photoelectric conversion units 101(n) to 101(n+4) into read-out nodes. In the present embodiment, FD parts 103(n) to 103(n+4) function as the read-out nodes. The transfer units 102(n) to 102(n+4) may be realized, for example, by N-type MOS transistors. Each of the FD parts 103(n) to 103(n+4) may be realized by an N-type semiconductor region. The electric charges transferred to the FD parts 103(n) to 103(n+4) are converted to voltages and then output via amplifiers 104(n) to 104(n+4).

The amplifiers 104(n) to 104(n+4) amplify signals based on the electric charges transferred to the corresponding FD parts 103(n) to 103(n+4) and output the resultant amplified signals to a signal line 108. Each of the amplifiers 104(n) to 104(n+4) may be realized by an N-type MOS transistor. Instead, to further reduce 1/f noise generated in the amplifiers, a P-type MOS transistor may be employed. In the case where the amplifiers 104(n) to 104(n+4) are realized using MOS transistors, each of the FD parts 103(n) to 103(n+4) is connected to a gate of corresponding one of the MOS transistors functioning as the amplifiers 104(n) to 104(n+4). The amplifiers 104(n) to 104(n+4) each may be of a non-inverting amplifier. More specifically, a source follower circuit may be formed by a MOS transistor together with a current source connected to the signal line 108, and the source follower circuit may be used as each amplifier. In the example shown in FIG. 1, the source follower circuit is employed. Note that the amplifier does not necessary need to have an amplification function, as long as the amplifier has a function of outputting the signal obtained as a result of converting the electric charge transferred to the node into the voltage or a signal based on the former signal.

Reset units 105(n) to 105(n+4) set the electric potentials of the corresponding FD parts 103(n) to 103(n+4) to predetermined values. The reset units 105(n) to 105(n+4) may be controlled such that they turn on in the same periods as those in which the corresponding transfer units 102(n) to 102(n+4) turn on, thereby setting the electric potentials of the photoelectric conversion units to particular values. The reset units 105(n) to 105(n+4) may be realized by N-type MOS transistors.

Selection units 106(n) to 106(n+4) control electrical connections between the amplifiers 104(n) to 104(n+4) and the signal line. More specifically, in response to a driving pulse supplied from a vertical scanning circuit, the selection units output signals from pixels or pixel rows sequentially or at random to the signal line 108. The selection units 106(n) to 106(n+4) may be realized by, for example, N-type MOS transistors.

Switches 107(n) to 107(n+4) are for electrically connecting different FD parts 103 to each other. A node of each of the switches 107(n) to 107(n+4) is connected to corresponding one of the FD parts 103(n) to 103(n+4). Note that each FD part and the first node of each switch may be formed by the same semiconductor region. The switches 107(n) to 107(n+4) may be realized by, for example, N-type MOS transistors. In the case where the switches 107(n) to 107(n+4) are realized using MOS transistors, a source or a drain of each MOS transistor is electrically connected to corresponding one of the FD parts. Alternatively, the source or the drain of each MOS transistor may share the same semiconductor region with corresponding one of the FD parts.

Bypass wirings 109a to 109c are each for connecting together nodes (second nodes) of a particular number of switches 107 wherein the second node is a node of the switch opposite to the node connected to corresponding one of the FD parts 103. In the example shown in FIG. 1, the second nodes of three switches 107(n+1) to 107(n+3) are connected together via a common bypass wiring 109b.

RES(n) to RES(n+4) are wirings for supplying driving pulses to control nodes of the reset units 105(n) to 105(n+4). SEL(n) to SEL(n+4) are wirings for supplying driving pulses to control nodes of the selection units 106(n) to 106(n+4). Tx(n) to Tx(n+4) are wirings for supplying driving pulses to control nodes of the transfer units 102(n) to 102(n+4). ADD (n) to ADD(n+4) are wirings for supplying driving pulses to control nodes of the switches 107(n) to 107(n+4). In the case where the above-described circuit elements are realized by MOS transistors, the driving pulses are supplied to the gates of the respective corresponding transistors.

According to the present embodiment, only one switch 107 is necessary as a switch connected to each FD part 103. This allows a reduction in capacitance of the FD part.

Figure 2:
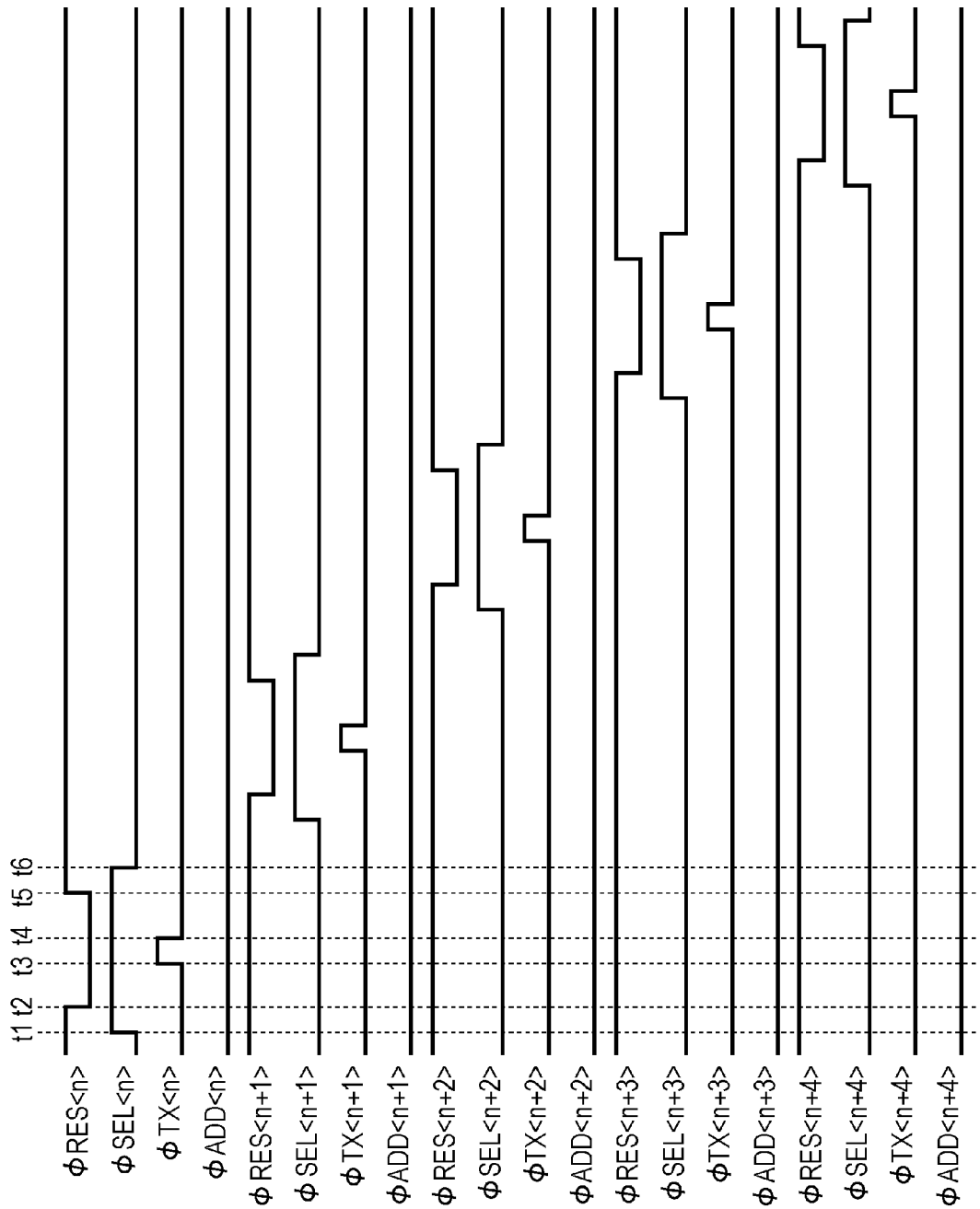
FIG. 2 is a diagram illustrating an example of a driving pulse pattern according to a first embodiment.
Figure 3:
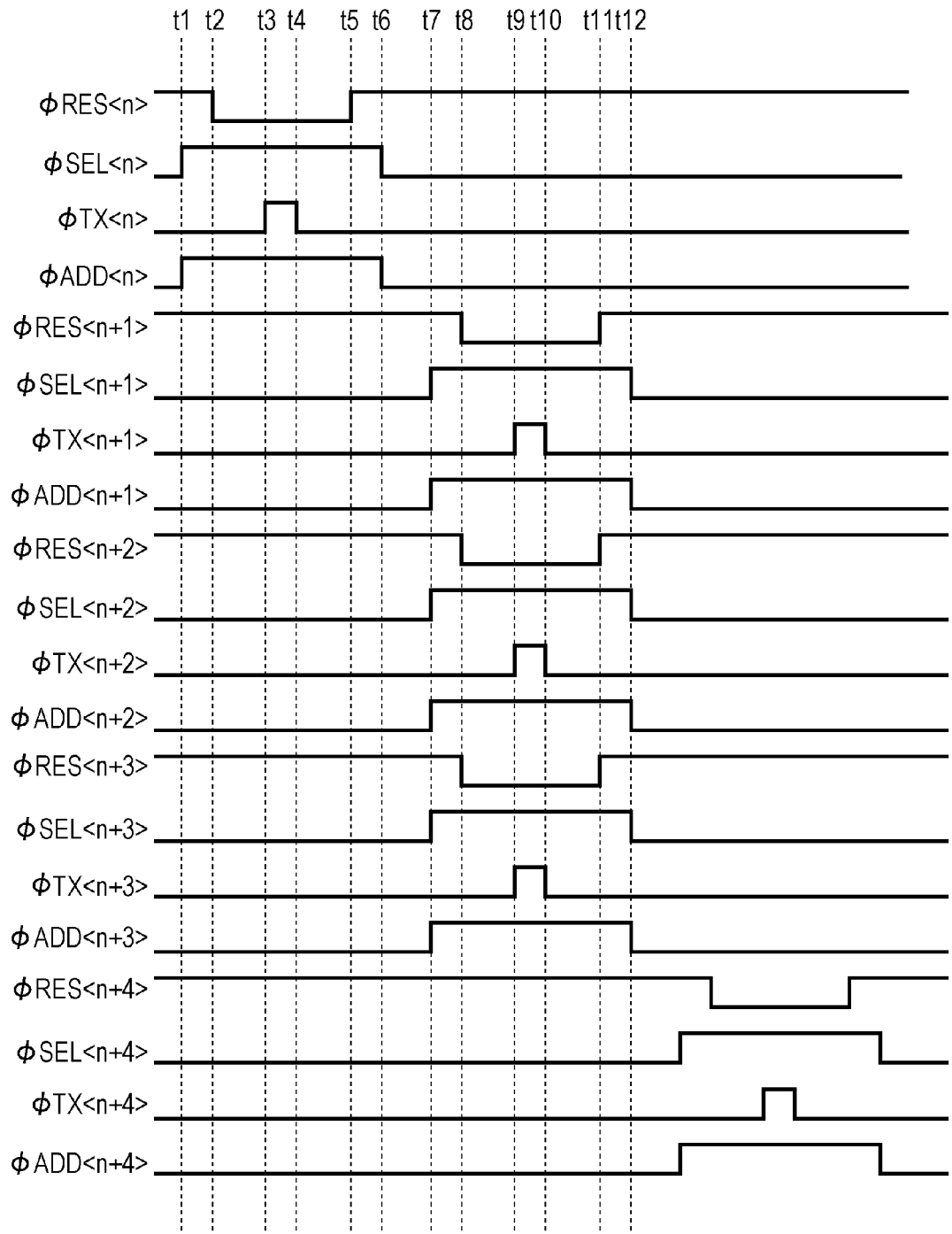
FIG. 3 is a diagram illustrating an example of a driving pulse pattern according to the first embodiment.
Figure 4:
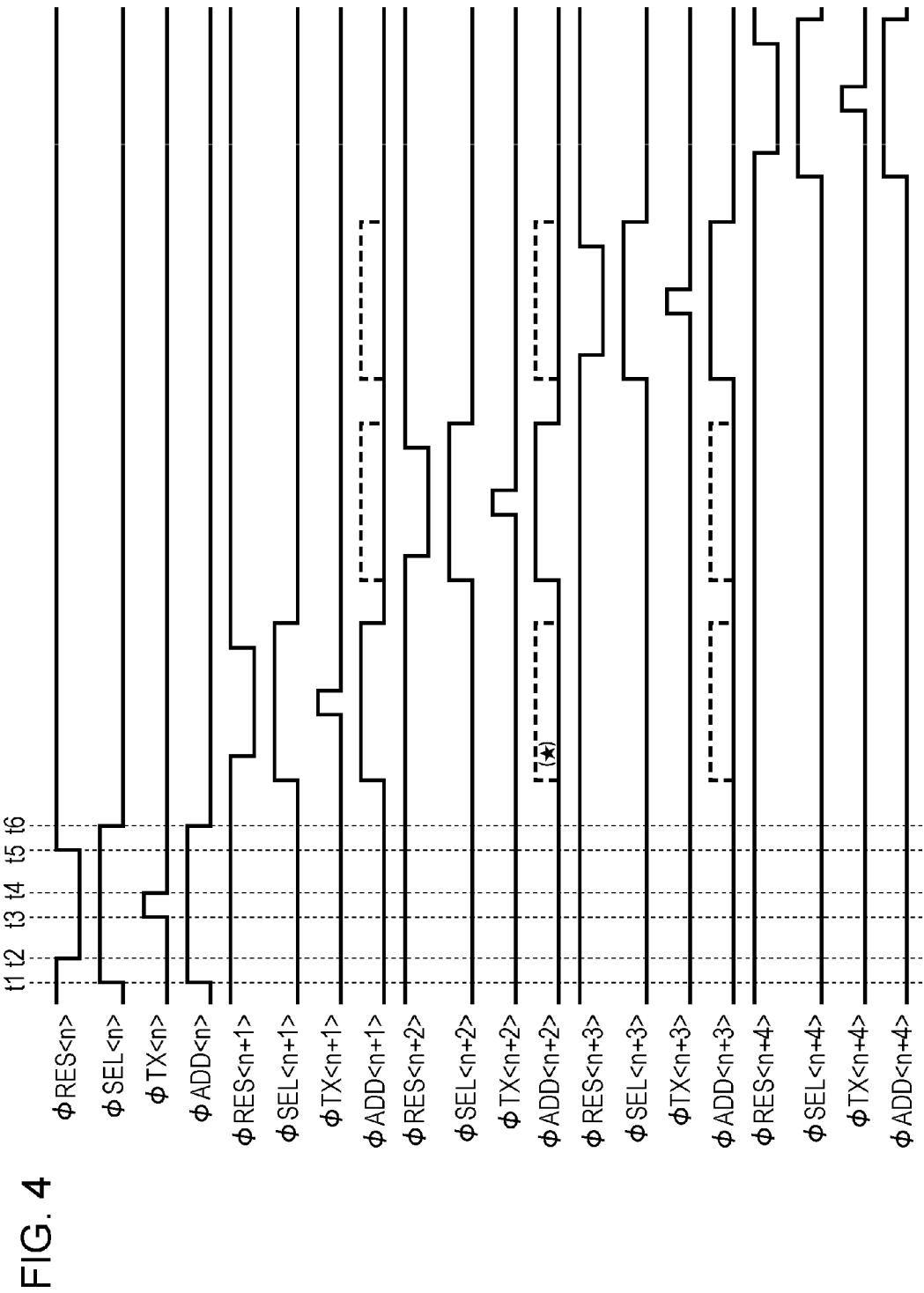
FIG. 4 is a diagram illustrating an example of a driving pulse pattern according to the first embodiment.

FIGS. 2 to 4 illustrate examples of driving pulses supplied to elements of the equivalent circuit diagram shown in FIG. 1 of an image pickup apparatus. In the following description, it is assumed that circuit elements in the equivalent circuit shown in FIG. 1 are realized by N-type MOS transistors. In this case, each transistor turns on in response to a high level of a corresponding driving pulse.

A driving pulse pattern shown in FIG. 2 is explained below. Reference symbols shown in this figure correspond to similar reference symbols shown in FIG. 1. The driving pulse pattern shown in FIG. 2 is an example used in a mode in which signals of pixels are read out independently.

In a whole period shown in FIG. 2, $\phi$ADD(n) to $\phi$ADD(n+4) are maintained at a low level, and thus the switches 107(n) to 107(n+4) are maintained in an off-state.

Before time t1, $\phi$RES(n) to $\phi$RES(n+4) are at a high level. That is, before time t1, the reset units 105(n) to 105(n+4) are in an on-state, and thus the FD parts 103(n) to 103(n+4) are supplied with a particular electric potential via the reset units 105(n) to 105(n+4). $\phi$SEL(n) to $\phi$SEL(n+4) are at the low level and thus the selection units 106(n) to 106(n+4) are in the off-state and no signal is output from any pixel to the signal line 108. $\phi$Tx(n) to $\phi$Tx(n+4) are at the low level.

At time t1, $\phi$SEL(n) turns from the low level to the high level. In response, the selection unit 106(n) turns into the on-state, and the electric potential of the signal line 108 turns into a value corresponding to an electric potential of an input node of the amplifier 104(n) of a pixel in an n-th row.

At time t2, $\phi$RES(n) turns from the low level to the high level. In response, the selection unit 106(n) turns into the on-state, and the electric potential of the signal line 108 turns into a value corresponding to an electric potential of the input node of the amplifier 104(n) of the pixel in the n-th row.

At time t3, $\phi$Tx(n) turns from the low level to the high level. In response, the transfer unit 102(n) turns into the on-state, and a transfer period starts in which an electric charge is transferred from the photoelectric conversion unit 101(n) to the FD part 103(n). The transfer period ends at time t4 at which $\phi$Tx(n) turns from the high level to the low level.

At time t5, $\phi$RES(n) turns from the low level to the high level. At time t6, $\phi$SEL(n) turns from the high level to the low level.

In a period from t2 to t3, an electric potential of the signal line 108 or a signal based on this electric potential is sampled and held by a not-shown circuit. In a period from t4 to t5, the electric potential of the signal line 108 or the signal based on this electric potential is sampled and held. The difference between these sampled-and-held signals is determined by a circuit at a following stage. As a result, a reduction in reset noise or like in pixels may be achieved.

By repeating the above process for each pixel row, one frame of signal is obtained. The operation described above may be used to obtain a still image or the like. For non-selected rows, it doesn't matter whether $\phi$ADD is at the low level or the high level. This also applies to other drive pulse patterns described below.

Next, a driving pulse pattern shown in FIG. 3 is explained below. The following description will focus on differences from the driving pulse pattern shown in FIG. 2. According to the driving pulse pattern shown in FIG. 3, signals from three pixels are added together.

At time t1, φADD(n) turns from the low level to the high level. In response, the switch 107(n) turns into the on-state. As a result, the FD part 103(n) is electrically connected to an FD part (not shown) adjacent in an upward direction in FIG. 1 to the FD part 103(n), and thus signals are added together.

In a period from time t1 to t6, φADD(n) is maintained at the high level. At time t6, φSEL(n) and φADD(n) turn from the high level to the low level. As with FIG. 2, in a period from t2 to t3 and a period from t4 to t5, a signal corresponding to an electric potential of the input node of the amplifier 104(n) is output. However, there is a difference from FIG. 2 in that a signal of a pixel is added with a signal of another pixel (not shown) and a result is output.

At t7 and thereafter, the process is performed as follows.

At time t7, φSEL(n+1), φADD(n+1), φSEL(n+2), φADD(n+2), φSEL(n+3), and φADD(n+3) turn from the low level to the high level. The transition in level of the φADD(n+1), φADD(n+2), and φADD(n+3) to the high level causes the switches 107(n+1), 107(n+2), and 107(n+3) to turn into the on-state. As a result, the FD parts 103(n+1), 103(n+2), and 103(n+3) are electrically connected together via the switches 107(n+1), 107(n+2), 107(n+3), and the bypass wiring 109b.

At time t8, φRES(n+1), φRES(n+2), and φRES(n+3) turn from the high level to the low level. This causes the electric potentials of the FD part 103(n+1), the FD part 103(n+2), and the FD part 103(n+3) to turn into a floating state.

At time t9, φTx(n+1), φTx(n+2), and φTx(n+3) turn from the low level to the high level. In response, electric charges of the photoelectric conversion unit 101(n+1), the photoelectric conversion unit 101(n+2), and the photoelectric conversion unit 101(n+3) are transferred to the FD part 103(n+1), the FD part 103(n+2), and the FD part 103(n+3), respectively. Because the switches 107(n+1), 107(n+2), and 107(n+3) are in the on-state, the electric charges transferred to the FD parts are added together.

At time t10, φTx(n+1), φTx(n+2), and φTx(n+3) turn from the high level to the low level. This ends the transfer period for transferring the electric charges from the photoelectric conversion units 101(n+1), 101(n+2), and 101(n+3) to the FD parts 103(n+1), 103(n+2), and 103(n+3), respectively.

At time t11, φRES(n+1), φRES(n+2), and φRES(n+3) turn from the low level to the high level. As a result, the electric potentials of the FD part 103(n+1), the FD part 103(n+2), and the FD part 103(n+3) are reset. Subsequently, at time t12, φSEL(n+1), φSEL(n+2), and φSEL(n+3) turn from the high level to the low level.

In a period from t2 to t3 and a period from t7 to t8, the electric potential of the signal line 108 or the signal based on this electric potential is sampled and held. Thereafter, in a period from t4 to t5 and a period from t10 to t11, the electric potential of the signal line 108 or the signal based on this electric potential is sampled and held. The difference between these electric potentials or signals is determined by a circuit at a following stage to reduce a pixel reset noise or the like.

According to the operation shown in FIG. 3, it is possible to add signals generated by a plurality of photoelectric conversion units. More specifically, electric charges generated by photoelectric conversion units are transferred to FD parts, and these FD parts are electrically connected via switches and a bypass wiring thereby achieving the addition of the electric charges. In the present example, a plurality of selection units 106, i.e., the selection unit 106(n+1), the selection unit 106 (n+2), and the selection unit 106(n+3) are simultaneously turned on to read out signals. Note that signals may be read out by turning on at least one of the three selection units 106(n+1) to 106(n+3), although it is more effective to simultaneously turn on two or more selection units to reduce the 1/f noise. Note that in FIG. 3, reset units perform the reset operation at the same time for pixels that are to be added. Alternatively, at least one of these reset units may be operated. However, it is advantageous to operate a plurality of reset units at the same time to reduce the reset period. On the other hand, operating a single reset unit leads to a reduction in a change in electric potential that occurs when the electric potential of the FD part is reset. This applies also to other driving pulse patterns in the add operation.

Next, a driving pulse pattern shown in FIG. 4 is explained below. According to the driving pulse pattern shown in FIG. 4, signals of pixels are read out independently. The driving pulse pattern shown in FIG. 4 is different from that shown in FIG. 2 in that the FD part 103 has greater capacitance in the read-out operation than the capacitance in the operation according to the driving pulse pattern shown in FIG. 2. More specifically, unlike the driving pulse pattern shown in FIG. 2 in which φADD is maintained at the low level over the whole period shown in FIG. 2, in the driving pulse pattern shown in FIG. 4, φADD turns alternately to the low level and the high level. In a period in which the level is turned to and maintained at the high level for φSEL of a row to be read out, φADD is turned to and maintained at the high level for pixel rows that may be electrically connected via FD parts and a bypass wiring to the row for which φSEL is at the high level. In the example shown in FIG. 4, the FD part 103(n+1), the FD part 103(n+2), and the FD part 103(n+3) are FD parts that may be electrically connected together via the bypass wiring 109b. More specifically, when one of the (n+1)th row, the (n+2)th row, and the (n+3)th row is selected as a row for which reading-out is to be performed, the driving pulse is turned to the high level for at least one of the switches 107(n+1), 107(n+2), and 107(n+3) corresponding to non-selected rows.

By switching the operation associated with φADD between that shown in FIG. 2 and that shown in FIG. 4, it is possible to switch the connection between the FD parts and the load capacitors to change the charge-to-voltage conversion factor of pixels. This makes it possible to change the sensitivity in the read-out operation. Furthermore, it becomes possible to increase an input dynamic range in terms of the amount of charge of the source follower circuit of the pixel. Therefore, it is possible to achieve a large dynamic range for incident light.

Second Embodiment

Figure 5:
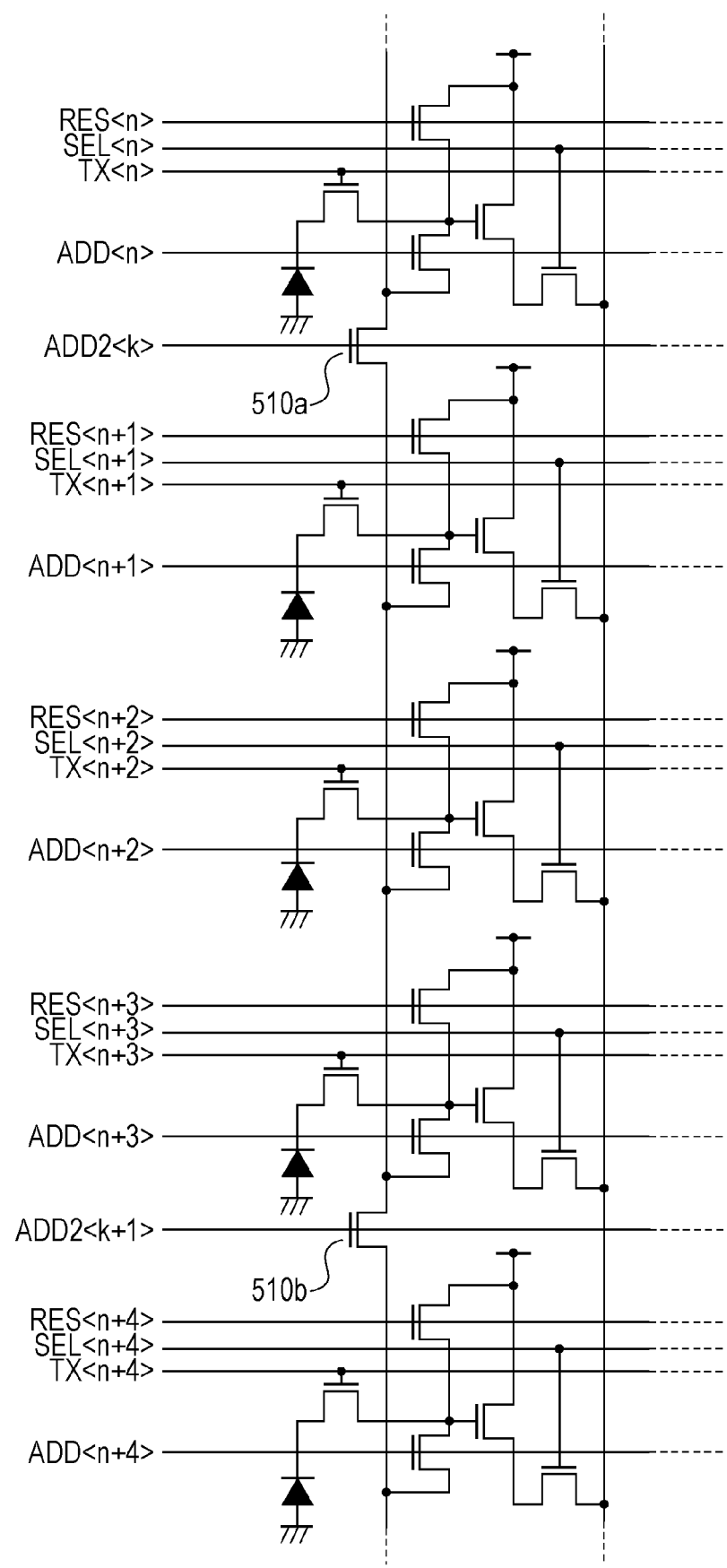
FIG. 5 is an equivalent circuit diagram of an image pickup apparatus according to a second embodiment.

FIG. 5 illustrates an equivalent circuit diagram of pixels according to a second embodiment. The second embodiment is different from the first embodiment in that switches for electrically connecting bypass wirings to each other are further provided. Other elements may be similar to those according to the first embodiment.

Switches 510a and 510b are switches for connecting bypass wirings to each other. The switch 510a is for electrically connecting a bypass wiring 509a and a bypass wiring 509b to each other. The switch 510b is for electrically connecting the bypass wiring 509b and a bypass wiring 509c to each other. This configuration makes it possible to change the number of pixels to be added together.

Figure 6:
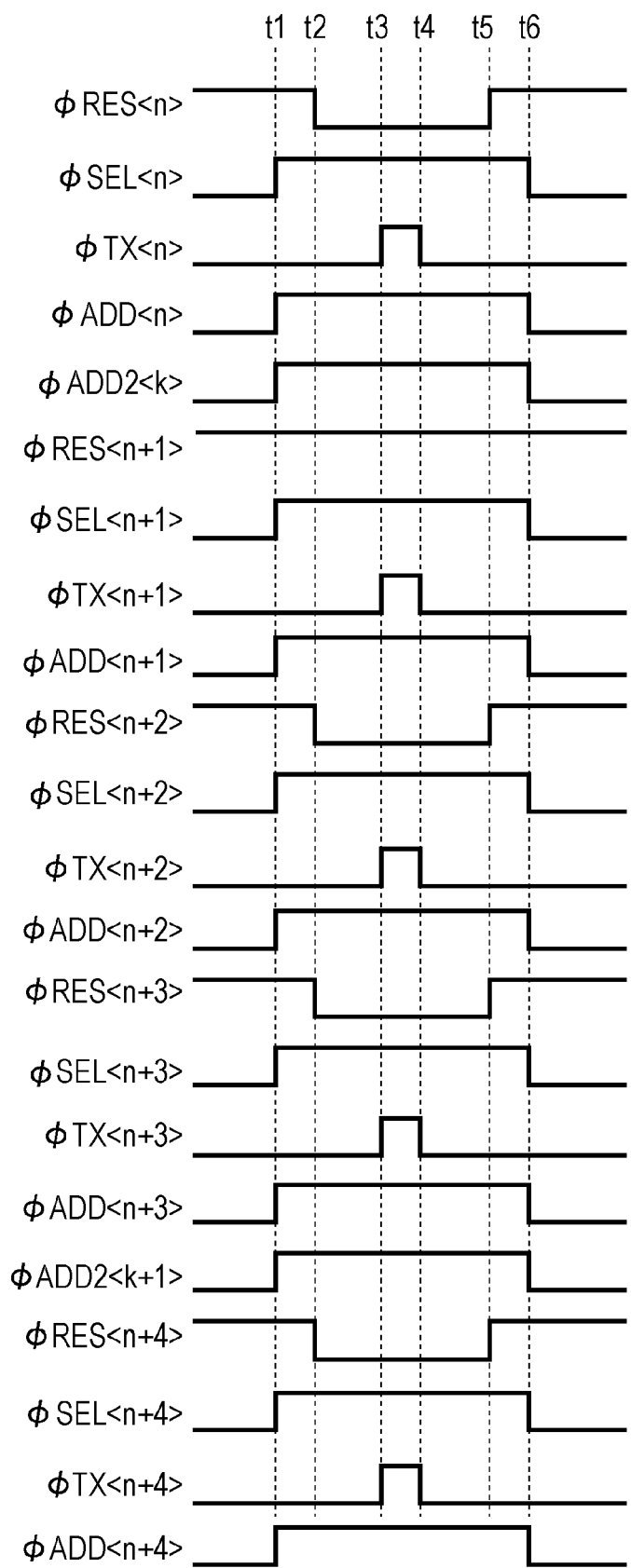
FIG. 6 is a diagram illustrating an example of a driving pulse pattern according to a second embodiment.

FIG. 6 illustrates an example of a driving pulse pattern for use in driving the configuration shown in FIG. 5. This driving pulse pattern shown in FIG. 6 is for adding signals of a plurality of pixels. In the present example, the addition is performed among signals of five pixels. However, the number of pixels to be added together is not limited to five. The addition may be performed among signals of an arbitrary number of pixels by properly modifying the operations of the switches.

At time t1, φADD2(k) and φADD2(k+1) turn from the low level to the high level. At the same time, φADD(n) to φADD(n+4) turn from the low level to the high level. As a result, signals from pixels in the n-th to (n+4)th rows may be added together. If φADD2(k) and φADD2(k+1) are maintained at the low level, three FD parts are connected together via the bypass wiring 509b, and thus signals from three pixels are added together.

Thus, according to the present embodiment, it becomes possible to change the number of pixels to be added together by providing the switches for connecting bypass wirings together.

Third Embodiment

Figure 7:
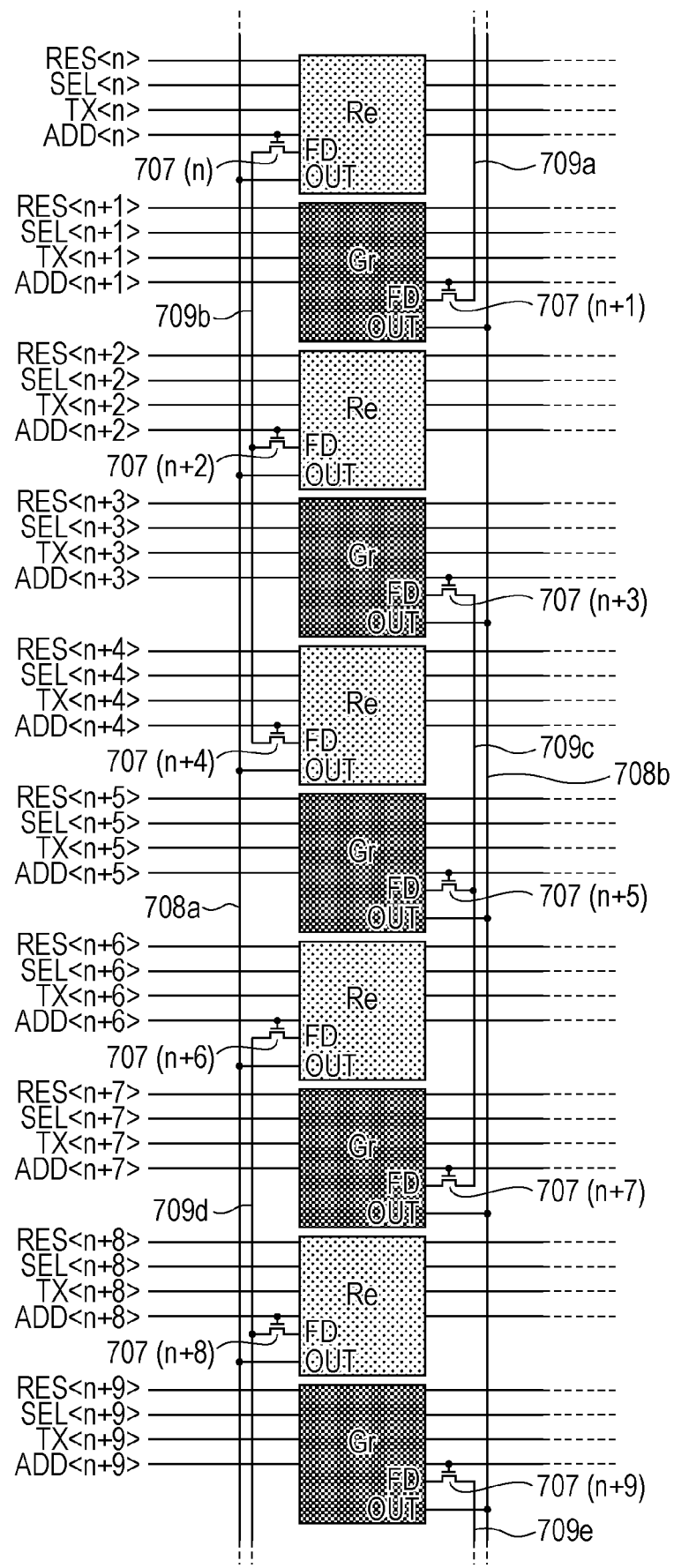
FIG. 7 is a block diagram schematically illustrating an image pickup apparatus according to a third embodiment.

FIG. 7 illustrates a pixel block diagram according to a third embodiment. Although an equivalent circuit of each pixel is not shown in FIG. 7, the equivalent circuit may be similar to that shown in FIG. 1 or FIG. 5. The image pickup apparatus according to the present embodiment is assumed to be a color image pickup apparatus. In the example shown in FIG. 7, green pixels Gr and red pixels Re are alternately disposed in an array. This arrangement may be used as a part of a Bayer pattern. In FIG. 7, elements similar to those according to the first or second embodiment are denoted by similar reference symbols, and a further detailed description thereof is omitted.

In FIG. 7, in each pixel, FD denotes a node connected to a FD part, and OUT denotes an output node. These elements correspond to elements shown in FIG. 1 such that FD corresponds to a read-out node to which an electric charge of a photoelectric conversion unit is transferred, and OUT corresponds to an output node of a selection unit. The present embodiment is different from the first and second embodiments in that a plurality of signal lines are provided in each pixel column. More specifically, in the example shown in FIG. 7, two signal lines are provided in each pixel column.

Switches 707(n), 707(n+2), and 707(n+4) are capable of electrically connecting FD parts of pixels in n-th, (n+2)th, and (n+4)th rows via a common bypass wiring 709b. Switches 707(n+3), 707(n+5), and 707(n+7) are capable of electrically connecting FD parts of pixels in (n+3)th, (n+5)th, and (n+7)th rows via a common bypass wiring 709c. The bypass wirings 709b and 709d for electrically connecting FD parts of pixels of red color are disposed close to a signal line 708a for reading out signals from the pixels of red color. The bypass wirings 709a, 709c, and 709e for electrically connecting FD parts of pixels of green color are disposed close to a signal line 708b for reading out signals from the pixels of green color. In other words, the distance between a bypass wiring for connecting together FD parts of pixels of a first color and a signal line for reading out signals from pixels of a second color is greater than the distance between the bypass wiring for connecting together the FD parts of pixels of the first color and a signal line for reading out signals from pixels of the first color. This configuration makes it possible to reduce a mixture of colors that may occur via capacitance between wirings. In particular, when the amplifier of each pixel is a non-inverting amplifier such as a source follower circuit, the present configuration is advantageous in that the electric potential of the signal line changes in the same direction as that in which the electric potential of the bypass wiring changes. The bypass wirings 709a to 709e are electrically isolated from each other.

Figure 8:
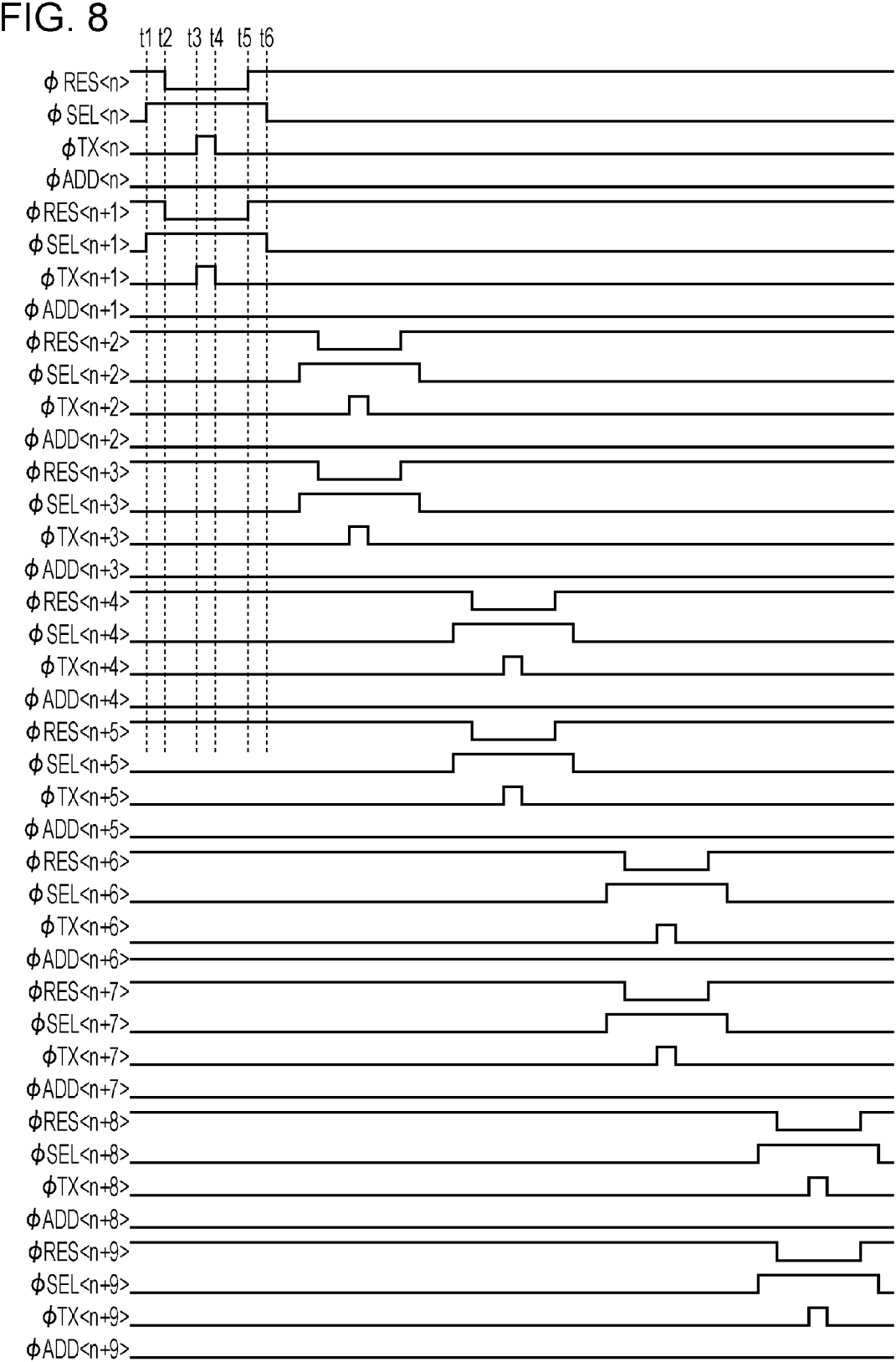
FIG. 8 is a diagram illustrating an example of a driving pulse pattern of the image pickup apparatus according to the third embodiment.
Figure 9:
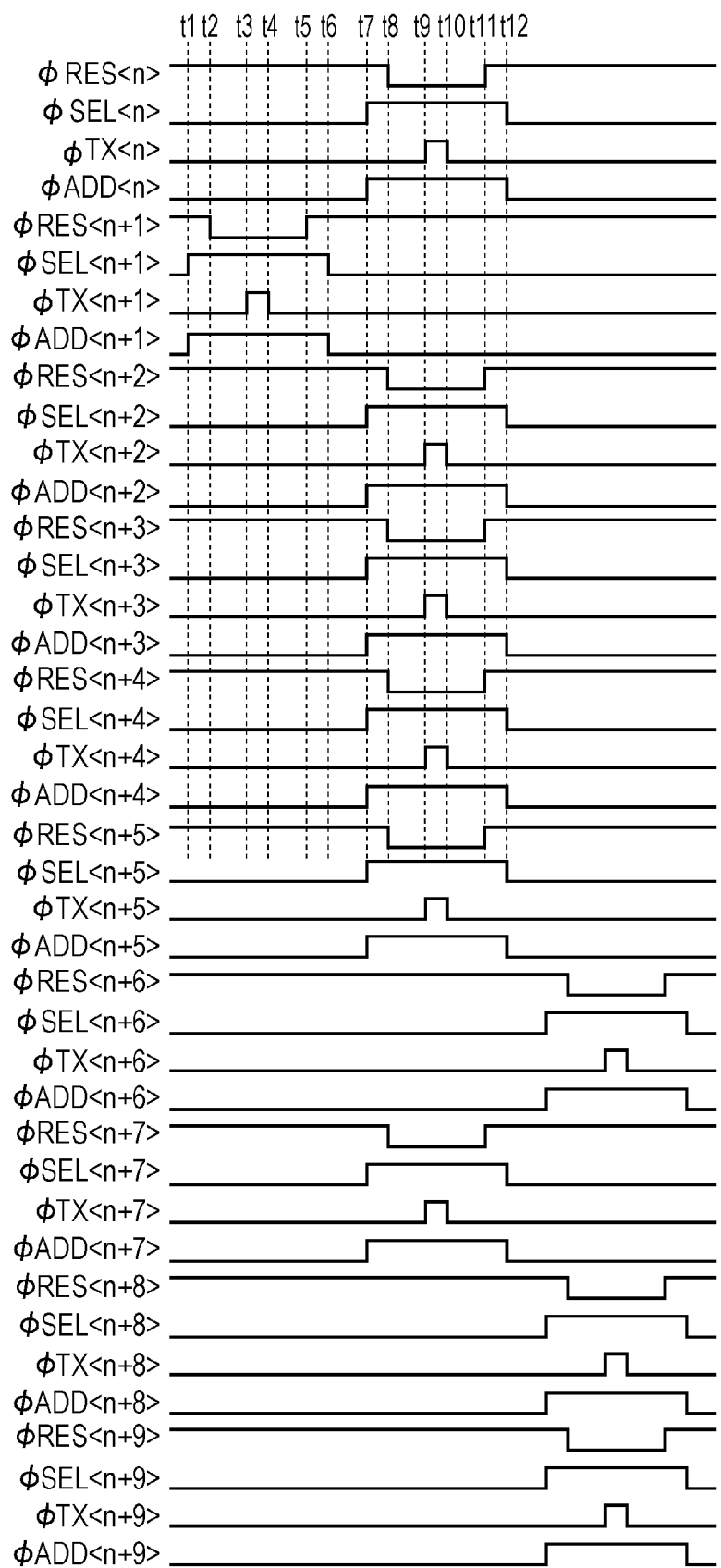
FIG. 9 is a diagram illustrating an example of a driving pulse pattern of the image pickup apparatus according to the third embodiment.

FIG. 8 and FIG. 9 illustrate driving pulse patterns for driving the image pickup apparatus with the configuration shown in FIG. 7. The driving pulse pattern shown in FIG. 8 is used in a mode in which signals from pixels are read out independently. The driving pulse pattern shown in FIG. 9 is used in a mode in which signals from a plurality of pixels are added together and then read out. In the example shown in FIG. 9, signals of three pixels of the same color are added and a result thereof is output. In a practical apparatus, these two driving pulse patterns may be selected according to a selected mode.

The driving pulse pattern shown in FIG. 8 is explained below. The operation according to this driving pulse pattern is basically similar to that described above with reference to FIG. 2 except that a plurality of signal lines are provided in each pixel column. In the present example, two signal lines are provided in each pixel column. In this configuration, a pixel from which a signal is read out to the signal line 708a and a pixel from which a signal is read out to the signal line 708b are simultaneously selected and read out.

The driving pulse pattern shown in FIG. 8 is explained in further detail below. In the following explanation, it is assumed that the pixel circuit is configured as shown in FIG. 7, and elements not shown in FIG. 7 are similar to those shown in FIG. 1. In a whole period shown in FIG. 8, φADD(n) to φADD(n+9) are maintained at the low level, and thus the switches 707(n) to 707(n+9) are maintained in the off-state.

Before time t1, φRES(n) to φRES(n+9) are at the high level. That is, before time t1, the reset units 105(n) to 105(n+9) are in the on-state, and thus the FD parts 103(n) to 103(n+9) are supplied with a particular electric potential via the reset units 105(n) to 105(n+9). φSEL(n) to φSEL(n+9) are at the low level and thus the selection units 106(n) to 106(n+9) are in the off-state and no signal is output from any pixel to the signal lines 708a and 708b. φTx(n) to φTx(n+4) are at the low level.

At time t1, φSEL(n) and φSEL(n+1) turn from the low level to the high level. In response, the selection units 106(n) and 106(n+1) turn into the on-state.

At time t2, φRES(n) and φRES(n+1) turn from the high level to the low level. As a result, the reset unit 105(n) and the reset unit 105(n+1) turn into the off-state. This causes the electric potentials of the FD part 103(n) and the FD part 103(n+1) to turn into the floating state. The electric potential of the signal line 708a turns into a value corresponding to an electric potential of the FD part 103(n), and the electric potential of the signal line 708b turns into an electric potential corresponding to an electric potential of the FD part 103(n+1).

At time t3, φTx(n) and φTx(n+1) turn from the low level to the high level. As a result, the transfer units 102(n) and 102(n+1) turn into the on-state, and a transfer period starts in which an electric charge is transferred from the photoelectric conversion unit 101(n) to the FD part 103(n), and furthermore a transfer period starts in which an electric charge is transferred from the photoelectric conversion unit 101(n+1) to the FD part 103(n+1).

The transfer period ends at time t4 at which φTx(n) and φTx(n+1) turn from the high level to the low level.

At time t5, φRES(n) and φRES(n+1) turn from the low level to the high level. At time t6, φSEL(n) and φSEL(n+1) turn from the high level to the low level.

In a period from t2 to t3, electric potentials of signal lines 708a and 708b or signals based on these electric potentials are sampled and held by not-shown circuits. In a period from t4 to t5, electric potentials of the signal lines 708a and 708b or signals based on these electric potentials are sampled and held. The difference between these sampled-and-held signals is determined by a circuit located at a following stage. As a result, a reduction in reset noise or like in pixels may be achieved.

By repeating the above process for each pixel row, one frame of signal is obtained. The operation described above may be used to obtain a still image or the like.

According to the driving pulse pattern described above, it is possible to independently read out signals from pixels. As with the driving pulse pattern shown in FIG. 4, a plurality of switches 709 connected to FD parts may be turned on to electrically connect the FD parts thereby changing the capacitance of the FD part.

Compared with the operation according to the driving pulse pattern shown in FIG. 2, the operation according to the current driving pulse pattern allows signals to be read out simultaneously from a plurality of rows even when signals of pixels are read out independently, and thus it becomes possible to read out signals at a high speed.

Next, a driving pulse pattern shown in FIG. 9 is described below. The driving pulse pattern shown in this figure is for adding together signals of a plurality of pixels and reading out a result. More specifically, signals of three pixels of the same color are added. The operation is basically similar to that described above with reference to FIG. 3 except that two signal lines are provided in each pixel column to allow signals of pixels of two colors to be added and output to corresponding signal lines. In FIG. 9, in an operation perform in a period from t7 to t12, signals of pixels of red color in n-th, (n+2)th, and (n+4)th rows are added via the switches 707(n), 707(n+2), and 707(n+4) and via the bypass wiring 709b.

Signals of pixels of green color (n+3)th, (n+5)th, and (n+7)th rows are added via the switches 707(n+3), 707(n+5), and 707(n+7) and via the bypass wiring 709c. In an operation performed in a period from t1 to t6, a signal of a pixel of green color in the (n+1)th row is added with signals of pixels of green color in (n−3)th and (n−1)th rows that are not shown in the figure. In the operation performed in the period from t1 to t6, signals of pixels of red color in (n−6)th, (n−4)th, and (n−2)th rows (not shown in the figure) are added together. In a period starting at time t12, signals of three pixels of red color in (n+6)th, (n+8)th, and (n+10)th rows are added, and signals of three pixels of green color in (n+9)th, (n+11)th, and (n+13)th rows are added.

That is, in the configuration shown in FIG. 7, pixels of the first color and pixels of the second color different from the first color are arranged alternately such that FD parts of each color are electrically connected together via a bypass wiring and switches associated with the color. The signals of the pixels of the respective colors are read out to corresponding signal lines. More specifically, the signals of the pixels of red color are read out to the signal line 708a, and the signals of the pixels of green color are read out to the signal line 708b.

The signal of the pixel of green color in the (n+1)th row is read out prior to the signal of the pixel of red color in the n-th row. The signal of the pixel of red color in the (n+6)th row is read out after the signal of the pixel of green color in the (n+7)th row.

According to the present embodiment, it is possible to switch the operation mode between the mode in which signals of pixels of the same color are added together and the result is output and the mode in which the signals of the respective pixels are read out independently. Furthermore, the provision of a plurality of signal lines in each pixel column makes it possible to achieve a further increase in the signal reading speed.

Fourth Embodiment

Figure 10:
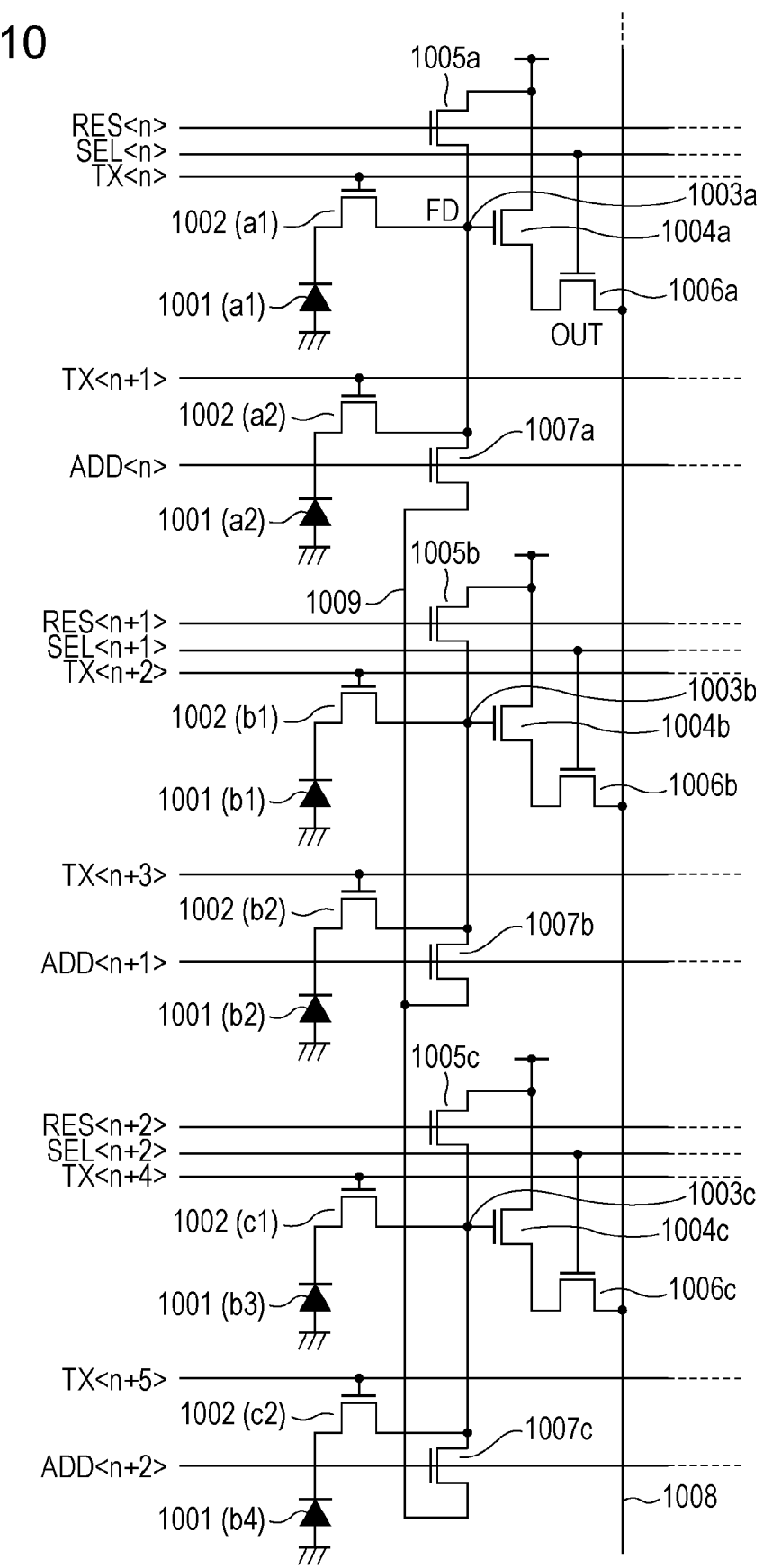
FIG. 10 is an equivalent circuit diagram of an image pickup apparatus according to a fourth embodiment.

FIG. 10 is an equivalent circuit diagram of a solid-state image pickup apparatus according to a fourth embodiment. The fourth embodiment is different from the first to third embodiments in that electric charges from a plurality of photoelectric conversion units are transferred to one FD part. In the configuration shown in FIG. 10, signals from two photoelectric conversion units are transferred to one FD part. Transferring from photoelectric conversion units is performed by depletion transfer.

In FIG. 10, charges are transferred from photoelectric conversion units 1001(a1) and 1001(a2) to an FD part 1003a. Similarly, charges are transferred from photoelectric conversion units 1001(b1) and 1001(b2) to an FD part 1003b, and charges are transferred from photoelectric conversion units 1001(c1) and 1001(c2) to an FD part 1003c. The FD parts 1003a to 1003c may be realized by a single semiconductor region, or separate semiconductor regions may be provided for respective transfer units and these semiconductor regions may be electrically connected via a wiring or the like.

Amplifiers 1004a to 1004c amplify signals based on the electric charges transferred to the FD parts 1003a to 1003c and output the resultant amplified signals. Reset units 1005a to 1005c set the electric potentials of the respective FD parts 1003a to 1003c to a reference potential. Selection units 1006a to 1006c control electrical connections between the amplifiers 1004a to 1004c and the signal line 1008. Switches 1007a to 1007c are connected such that a first node of each of them is connected to a corresponding FD part, and a second node is connected to the bypass wiring 1009. The electric charges transferred to the FD parts 1003a to 1003c may be added together via the switches 1007a to 1007c and the bypass wiring 1009.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2011-128143 filed Jun. 8, 2011, which is hereby incorporated by reference herein in its entirety.

What is claimed is:

1. An image pickup apparatus comprising:
    a plurality of pixels each including a photoelectric conversion unit, an amplifying transistor configured to amplify a signal based on an electric charge generated in the photoelectric conversion unit, a transfer transistor configured to transfer the electric charge generated in the photoelectric conversion unit to an input node of the amplifying transistor, and a reset transistor including a third node directly connected to the input node of the amplifying transistor and a fourth node electrically connected to a reset voltage line, and
    a switch transistor including a first node, a second node, and a control node, the first node directly connected to the input node of the amplifying transistor, the second node directly connected to a common wiring;
    wherein the common wiring electrically connects the input node of the amplifying transistor of a first pixel of the plurality of pixels to the input node of the amplifying transistor of another pixel of the plurality of pixels, and
    wherein at least two of the second nodes are directly connected to the common wiring.

2. The image pickup apparatus according to claim 1, wherein electric charges transferred to a plurality of input nodes are added together via a plurality of switches and the common wiring.

3. The image pickup apparatus according to claim 1, wherein each pixel further includes a transfer unit disposed in an electrical path between the photoelectric conversion unit and the first node.

4. The image pickup apparatus according to claim 1, wherein
- pixels of a first color and pixels of a second color are arranged alternately,
- second nodes of switches included in the respective pixels of the first color are connected in common to a first wiring, and
- second nodes of switches included in the respective pixels of the second color are connected in common to a second wiring.

5. The image pickup apparatus according to claim 1, wherein
- the pixels are arranged in a matrix, and
- a plurality of signal lines are provided in each pixel column.

6. The image pickup apparatus according to claim 1, wherein
- the pixels are arranged in a matrix,
- a plurality of signal lines are provided in each pixel column,
- pixels of a first color and pixels of a second color are arranged alternately in each pixel column,
- second nodes of switches included in the respective pixels of the first color are connected in common to a first wiring,
- second nodes of switches included in the respective pixels of the second color are connected in common to a second wiring,
- signals from the pixels of the first color are output to a first signal line, and
- signals from the pixels of the second color are output to a second signal line.

7. The image pickup apparatus according to claim 6, wherein the first wiring and the second wiring are electrically isolated from each other.

8. The image pickup apparatus according to claim 6, wherein the amplifying transistor comprises a non-inverting amplifier, and the distance between the first wiring and the second signal line is greater than the distance between the first wiring and the first signal line.

9. The image pickup apparatus according to claim 1, wherein an electric charge generated in a first photoelectric conversion unit and an electric charge generated in a second photoelectric conversion unit are transferred by depletion transfer to the input node.

10. The image pickup apparatus according to claim 1, wherein the common wiring includes a common bypass wiring.

11. An image pickup apparatus comprising:
- a plurality of pixels each including a photoelectric conversion unit, an amplifying transistor configured to amplify a signal based on an electric charge generated in the photoelectric conversion unit, a transfer transistor configured to transfer the electric charge generated in the photoelectric conversion unit to an input node of the amplifying transistor, and a reset transistor including a third node directly connected to the input node of the amplifying transistor and a fourth node electrically connected to a reset voltage line, and
- a switch transistor including a first node, a second node, and a control node, the first node directly connected to the input node of the amplifying transistor, the second node directly connected to a common wiring;
- wherein the common wiring electrically connects the input node of the amplifying transistor of a first pixel of the plurality of pixels to the input node of the amplifying transistor of another pixel of the plurality of pixels,
- pixels of a first color and pixels of a second color are arranged alternately in each pixel column,
- second nodes of switch transistors included in the respective pixels of the first color are directly electrically connected in common to a first wiring,
- second nodes of switch transistors included in the respective pixels of the second color are directly electrically connected in common to a second wiring,
- signals from the pixels of the first color are output to a first signal line,
- signals from the pixels of the second color are output to a second signal line,
- the amplifying transistor comprises a non-inverting amplifier, and
- the distance between the first wiring and the second signal line is greater than the distance between the first wiring and the first signal line, and
- wherein at least two of the second nodes are directly connected to the common wiring.

12. The image pickup apparatus according to claim 11, wherein the common wiring includes a common bypass wiring.

13. A method of driving an image pickup apparatus including a plurality of pixels each including a photoelectric conversion unit, an amplifying transistor configured to amplify a signal based on an electric charge generated in the photoelectric conversion unit, a transfer transistor configured to transfer the electric charge generated in the photoelectric conversion unit to an input node of the amplifying transistor, and a reset transistor including a third node directly connected to the input node of the amplifying transistor and a fourth node electrically connected to a reset voltage line, and a switch transistor including a first node, a second node, and a control node, the first node directly connected to the input node of the amplifying transistor, the second node directly connected to a common wiring, wherein the common wiring electrically connects the input node of the amplifying transistor of a first pixel of the plurality of pixels to the input node of the amplifying transistor of another pixel of the plurality of pixels, the method comprising:
- turning on a plurality of the switch transistors in the plurality of pixels such that the electric charges transferred to a plurality of the input nodes are added together via the common wiring,
- wherein at least two of the second nodes are directly connected to the common wiring.

14. The method according to claim 13, wherein the plurality of the switch transistors are turned into an off-state and signals of respective pixels are read out independently.

15. The method according to claim 13, wherein among the switch transistors with the second node electrically connected to the common wiring, a particular number of the switch transistors are turned on to increase a capacitance of the input node.

16. The method according to claim 13, wherein signals of a plurality of pixels are simultaneously output to a plurality of signal lines provided in each pixel column.

17. The method according to claim 16, wherein the signals simultaneously output to the signal lines are each a signal obtained by adding the signals of the plurality of pixels.

18. The method according to claim 13, wherein the common wiring includes a common bypass wiring.

* * * * *